United States Patent
Koivisto et al.

(10) Patent No.: US 9,077,414 B2
(45) Date of Patent: Jul. 7, 2015

(54) METHOD, APPARATUSES AND COMPUTER PROGRAM PRODUCTS FOR TRANSMISSION DIVERSITY

(75) Inventors: Tommi Koivisto, Espoo (FI); Kari Hooli, Oulu (FI); Kari Pajukoski, Oulu (FI); Esa Tiirola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 440 days.

(21) Appl. No.: 13/127,365

(22) PCT Filed: Nov. 3, 2008

(86) PCT No.: PCT/EP2008/064869
§ 371 (c)(1),
(2), (4) Date: May 3, 2011

(87) PCT Pub. No.: WO2010/060453
PCT Pub. Date: Jun. 3, 2010

(65) Prior Publication Data
US 2011/0211569 A1    Sep. 1, 2011

(51) Int. Cl.
*H04W 4/00*    (2009.01)
*H04B 7/06*    (2006.01)
*H04L 25/02*    (2006.01)

(52) U.S. Cl.
CPC ............ *H04B 7/0691* (2013.01); *H04B 7/0682* (2013.01); *H04L 25/0204* (2013.01)

(58) Field of Classification Search
USPC .......... 370/345, 208; 375/260, 267, 295, 299
See application file for complete search history.

(56) References Cited

U.S. PATENT DOCUMENTS

2001/0033600 A1* 10/2001 Yang et al. .................... 375/130
2003/0133493 A1* 7/2003 Suzuki et al. .................. 375/130
2004/0165676 A1* 8/2004 Krishnan et al. ............... 375/267
2006/0008021 A1* 1/2006 Bonnet ........................... 375/267
2006/0239224 A1* 10/2006 Borst et al. ..................... 370/329
2007/0127586 A1* 6/2007 Hafeez ........................... 375/267
2008/0310360 A1* 12/2008 Heo et al. ....................... 370/329
2010/0080314 A9* 4/2010 van Rooyen ................... 375/267
2010/0130221 A1* 5/2010 Imamura ..................... 455/452.1

OTHER PUBLICATIONS

"3rd Generation Partnership Project; Technical Specification Group Radio Access Network; Requirements for Further Advancements for E-UTRA(LTE-Advanced) (Release 8)", 3GPP TR 36.913, v8.0.0, Jun. 2008, pp. 1-14.
"3rd Generation Partnership Project; Technical Specification Group Radio Access Network; Evolved Universal Terrestrial Radio Access (E-UTRA); Physical Channels and Modulation (Release 8)", 3GPP TS 36.211, v8.3.0, May 2008, pp. 1-77.
International Search Report and Written Opinion received for corresponding Patent Cooperation Treaty Application No. PCT/EP2008/064869, dated Aug. 4, 2009, 13 pages.
"Transmit diversity for PUCCH in LTE-A", 3GPP TSG-RAN WG1#54, R1-083159, Agenda: 12, Aug. 18-22, 2008, pp. 1-4.

* cited by examiner

*Primary Examiner* — Jamal Javaid
(74) *Attorney, Agent, or Firm* — Squire Patton Boggs (US) LLP

(57) ABSTRACT

The invention is related to an apparatus comprising: a grouper configured to group antennas into antenna groups, if more antennas suitable for transmission are provided than pilot resources per a time slot; a rotator configured to rotate selected symbols with antenna-specific or antenna group-specific, and/or data symbol-specific phases; a transmitter configured to transmit symbols using a first antenna or antenna group of a user device and the rotated symbols using at least one second antenna or antenna group of the user device.

13 Claims, 3 Drawing Sheets

METHOD, APPARATUSES AND COMPUTER PROGRAM PRODUCTS FOR TRANSMISSION DIVERSITY

RELATED APPLICATION

This application was originally filed as PCT Application No. PCT/EP2008/064869 filed Nov. 3, 2008, which is incorporated herein by reference in its entirety.

FIELD

The invention relates to methods, apparatuses and computer program products for transmission diversity.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

An increased focus on extending and optimizing the 3rd Generation Partnership Project (3GPP) Long Term Evolution (LTE) Release 8 radio access technologies for providing higher data rates cost-effectively exists. An improved version of the Long Term Evolution radio access system is called LTE-Advanced (LTE-A). The main target of the 3GPP project is to improve the Universal Mobile Telecommunications System (UMTS) mobile phone standard for providing an enhanced user experience and simplified technology for next generation mobile broadband. The LTE is designed to support high-speed data, multimedia unicast and multimedia broadcast services.

Typically, higher data rates also set increased requirements for control signaling. Uplink control signals, such as Acknowledgement (ACK), Negative Acknowledgement (NACK), Channel Quality Indicator (CQI), and uplink scheduling requests may be transmitted on a Physical Uplink Control Channel (PUCCH) in the absence of uplink data.

In LTE, PUCCH Format 2 is designed to convey periodic CQI, Precoding Matrix Indicator (PMI) and Rank Indicator (RI). Control signaling in PUCCH is based on sequence modulation. Cyclically shifted zero-autocorrelation sequences take care of both code-division multiple access between user devices and the conveyance of the control information. On the PUCCH Format 2 zero-autocorrelation sequences of length 12 symbols (1 resource block) are Quadrature Phase Shift keying (QPSK) modulated thus carrying two information bits per sequence. Different user devices may be multiplexed by using different cyclic shifts of a zero-autocorrelation sequence into the given frequency/time resource. Typically, six parallel channels per a Resource Block (RB) are provided, assuming that an every second cyclic shift is in use.

BRIEF DESCRIPTION

According to another aspect of the present invention, there is provided an apparatus comprising: a grouper configured to group antennas into antenna groups, if more antennas suitable for transmission are provided than pilot resources per a time slot; a rotator configured to rotate selected symbols with antenna-specific or antenna group-specific, and/or data symbol-specific phases; a transmitter configured to transmit symbols using a first antenna or antenna group of a user device and the rotated symbols using a second antenna or antenna group of the user device.

According to another aspect of the present invention, there is provided an apparatus, comprising: estimator configured to make time-slot specific channel estimates for signals received from a first and at least one second transmission antenna or antenna group of a user device; a rotator configured to rotate a channel estimate made for a signal transmitted by the at least one second antenna or antenna group of the user device with antenna-specific or antenna group-specific, and/or data symbol-specific phases; and a determinator configured to determine a symbol-specific combined channel estimate for a time-slot by summing and/or averaging the channel estimates.

According to another aspect of the present invention, there is provided a method comprising: grouping antennas into antenna groups, if more antennas suitable for transmission are provided than pilot resources per a time slot; transmitting symbols using a first antenna or antenna group of a user device; and rotating selected symbols with antenna-specific or antenna group-specific, and/or data symbol-specific phases; and transmitting the rotated symbols using at least one second antenna or antenna group of the user device.

According to another aspect of the present invention, there is provided a method comprising: making time-slot specific channel estimates for signals received from a first and at least one second transmission antenna or antenna group of a user device; rotating a channel estimate made for a signal transmitted by the at least one second antenna or antenna group of the user device with antenna-specific or antenna group-specific, and/or data symbol-specific phases; and determining a symbol-specific combined channel estimates by summing and/or averaging the channel estimates.

According to another aspect of the present invention, there is provided a method comprising: determining if data-symbol specific phases equal to an orthogonal sequence element used on a predetermined reference signal symbol are used; making reference signal symbol specific channel estimates for signals received from a first and at least one second transmission antenna or antenna group of a user device; and using the channel estimates corresponding to the predetermined reference signal symbol in a coherent demodulation of a data symbol.

According to another aspect of the present invention, there is provided an apparatus comprising: means for grouping antennas into antenna groups, if more antennas suitable for transmission are provided than pilot resources per a time slot; means for transmitting symbols using a first antenna or antenna group of a user device; and means for rotating selected symbols with antenna-specific or antenna group-specific, and/or data symbol-specific phases; and means for transmitting the rotated symbols using at least one second antenna or antenna group of the user device.

According to another aspect of the present invention, there is provided an apparatus comprising: means for making time-slot specific channel estimates for signals received from a first and at least one second transmission antenna or antenna group of a user device; means for rotating a channel estimate made for a signal transmitted by the at least one second antenna or antenna group of the user device with antenna-specific or antenna group-specific, and/or data symbol-specific phases; and means for determining a symbol-specific combined channel estimates by summing and/or averaging the channel estimates.

According to another aspect of the present invention, there is provided an apparatus comprising: means for determining if data-symbol specific phases equal to an orthogonal sequence element used on a predetermined reference signal symbol are used; means for making reference signal symbol specific channel estimates for signals received from a first and at least one second transmission antenna or antenna group of a user device; and means for using the channel estimates corresponding to the predetermined reference signal symbol in a coherent demodulation of a data symbol.

According to another aspect of the present invention, there is provided a computer program product, embodied on a computer-readable medium configured to control a processor to perform a method, the method comprising: grouping antennas into antenna groups, if more antennas suitable for transmission are provided than pilot resources per a time slot; transmitting symbols using a first antenna or antenna group of a user device; and rotating selected symbols with antenna-specific or antenna group-specific, and/or data symbol-specific phases; and transmitting the rotated symbols using at least one second antenna or antenna group of the user device.

According to another aspect of the present invention, there is provided a computer program product, embodied on a computer-readable medium configured to control a processor to perform a method, the method comprising: making time-slot specific channel estimates for signals received from a first and at least one second transmission antenna or antenna group of a user device; rotating a channel estimate made for a signal transmitted by the at least one second antenna or antenna group of the user device with antenna-specific or antenna group-specific, and/or data symbol-specific phases; and determining a symbol-specific combined channel estimates by summing and/or averaging the channel estimates.

According to another aspect of the present invention, there is provided a computer program product, embodied on a computer-readable medium configured to control a processor to perform a method, the method comprising: determining if data-symbol specific phases equal to an orthogonal sequence element used on a predetermined reference signal symbol are used: making reference signal symbol specific channel estimates for signals received from a first and at least one second transmission antenna or antenna group of a user device; and using the channel estimates corresponding to the predetermined reference signal symbol in a coherent demodulation of a data symbol.

LIST OF DRAWINGS

Embodiments of the present invention are described below, by way of example only, with reference to the accompanying drawings, in which FIG. 1 illustrates an example of a system;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user terminal, server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of a system architecture whereto the embodiments may be applied, an architecture based on Evolved UMTS terrestrial radio access (E-UTRA, UMTS=Universal Mobile Telecommunications System) without restricting the embodiment to such an architecture, however.

Many different radio protocols to be used in communications systems exist. Some examples of different communication systems are the Universal Mobile Telecommunications System (UMTS) radio access network (UTRAN or E-UTRAN), Long Term Evolution (LTE, the same as E-UTRA), Wireless Local Area Network (WLAN), Worldwide Interoperability for Microwave Access (WiMAX), Bluetooth®, Personal Communications Services (PCS) and systems using Ultra Mobile Wideband (UWB) technology.

Figure 1:
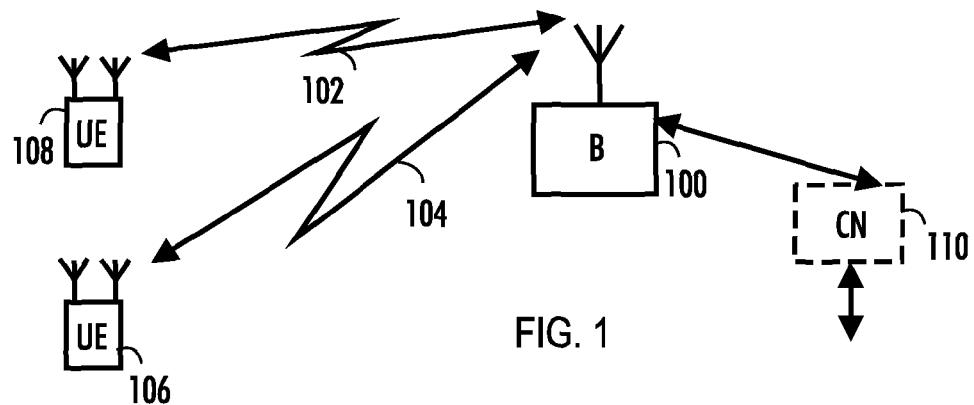

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

FIG. 1 shows a part of a radio access network of E-UTRA which is air interface of Release 8. Advantages obtainable by LTE (or E-UTRA) are a possibility to use plug and play devices, and Frequency Division Duplex (FDD) and Time Division Duplex (TDD) in the same platform. The E-UTRA according to Release 8 uses Orthogonal Frequency Division Multiple Access (OFDMA) for the downlink and Single Carrier FDMA (SC-FDMA) for the uplink, and employs multiple-input and multiple-output (MIMO) with up to four antennas per station. In the uplink, a pre-coded version of Orthogonal Frequency Division Multiplexing (OFDM) called a Single Carrier Frequency Division Multiple Access (SC-FDMA) is used.

In OFDM systems, available bandwidth is divided into narrower sub-carriers and data is transmitted in parallel streams. Each OFDM symbol is a linear combination of the signals on each of the subcarriers. Further, each OFDM symbol is preceded by a cyclic prefix (CP), which is used to decrease Inter-Symbol Interference. Unlike in OFDM. SC-FDMA subcarriers are not independently modulated.

The communications system is a cellular radio system which comprises a node B (or an Enhanced node B (eNodeB), base station) 100, which has bi-directional radio links 102 and 104 to user devices (UE) 106 and 108. The user devices may be fixed, vehicle-mounted or portable. The user devices 106 and 108 may refer to portable computing devices. Such computing devices include wireless mobile communication devices operating with or without a subscriber identification module (SIM), including, but not limited to, the following types of devices: mobile phone, multimedia device, personal digital assistant (PDA), handset. In this example, the user devices have multiple antennas.

The eNodeB includes transceivers, for instance. From the transceivers of the eNodeB, a connection is provided to an antenna unit that establishes bi-directional radio links to the user devices. The eNodeB is further connected to a core network 110 (CN). Depending on the system, the counterpart on the CN side can be a serving System Architecture Evolution (SAE) gateway (routing and forwarding user data packets), Packet Data Network Gateway (PDN GW, for providing connectivity to user devices (UEs) to external packet data networks, or Mobile Management Entity (MME).

The embodiments are not, however, restricted to the system given as an example but a person skilled in the art may apply the solution to other communication systems provided with the necessary properties. Different radio protocols may be used in the communication systems in which embodiments of the invention are applicable. The radio protocols used are not relevant regarding the embodiments of the invention.

The communication system is also able to communicate with other networks, such as a public switched telephone network or the Internet.

Embodiments provide Physical Uplink Control Channel (PUCCH) format 2 arrangement that allows the use of multiple transmit antennas without reducing the multiplexing capacity of PUCCH yet providing transmission antenna diversity. Additionally, the concept of antenna re-grouping between slots may reduce the impact of possible negative correlation between the transmit antennas. Furthermore, the concept is robust against the Doppler phenomenon.

It should also be noticed that the proposed multi-antenna extension enables that user devices supporting different releases, such as Rel. 8 and Rel. 10, may share the same PUCCH resources.

Next, embodiments of methods will be described with reference to FIGS. 3 and 4. The embodiments relate to enabling data symbol estimation in a receiver.

In LTE-Advanced, open-loop transmission diversity methods are used on PUCCH (Frequency division duplex and/or Time division duplex are deployed). The open-loop transmission diversity typically requires orthogonal resources for different antennas for reducing interference. The open-loop solution needs also to support high velocities of user devices.

In an embodiment, a separate PUCCH channel is provided for different antennas of a user device. The transmission mode used is a Single-User Multiple Input Multiple Output (SU-MIMO) which exploits spatial multiplexing. Different MIMO systems are designed to provide improved performance, such as higher throughput, greater capacity and improved reliability. The MIMO systems can be divided into two modes: single-user MIMO and multi-user MIMO. One target of the single-user MIMO (SU-MIMO) is to increase peak data rate per a user device, whereas a main target of the multi-user MIMO (MU-MIMO) is to increase sector or service cell capacity.

Figure 2:
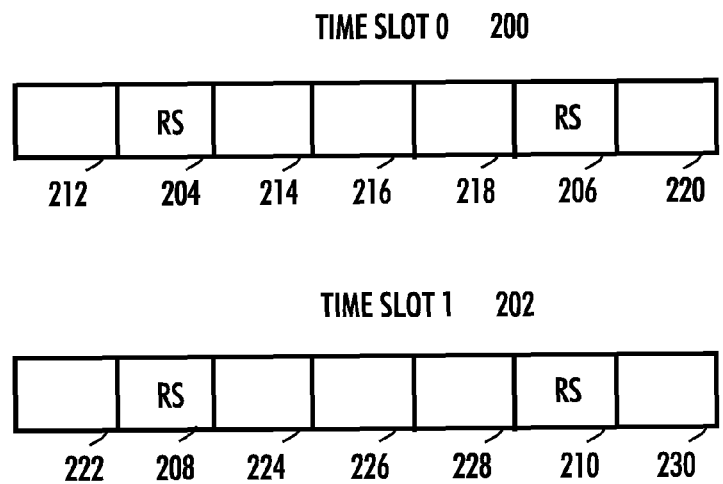
FIG. 2 illustrates an example of a PUCCH format 2 transmission frame.

In FIG. 2, a PUCCH format 2 transmission frame is shown. The frame includes 2 frequency hopping time slots, slot 0 200 and slot 1 202. With a normal cyclic prefix, a slot contains two OFDM symbols for demodulation reference signal and five OFDM symbols for control data 212-230.

Figure 3:
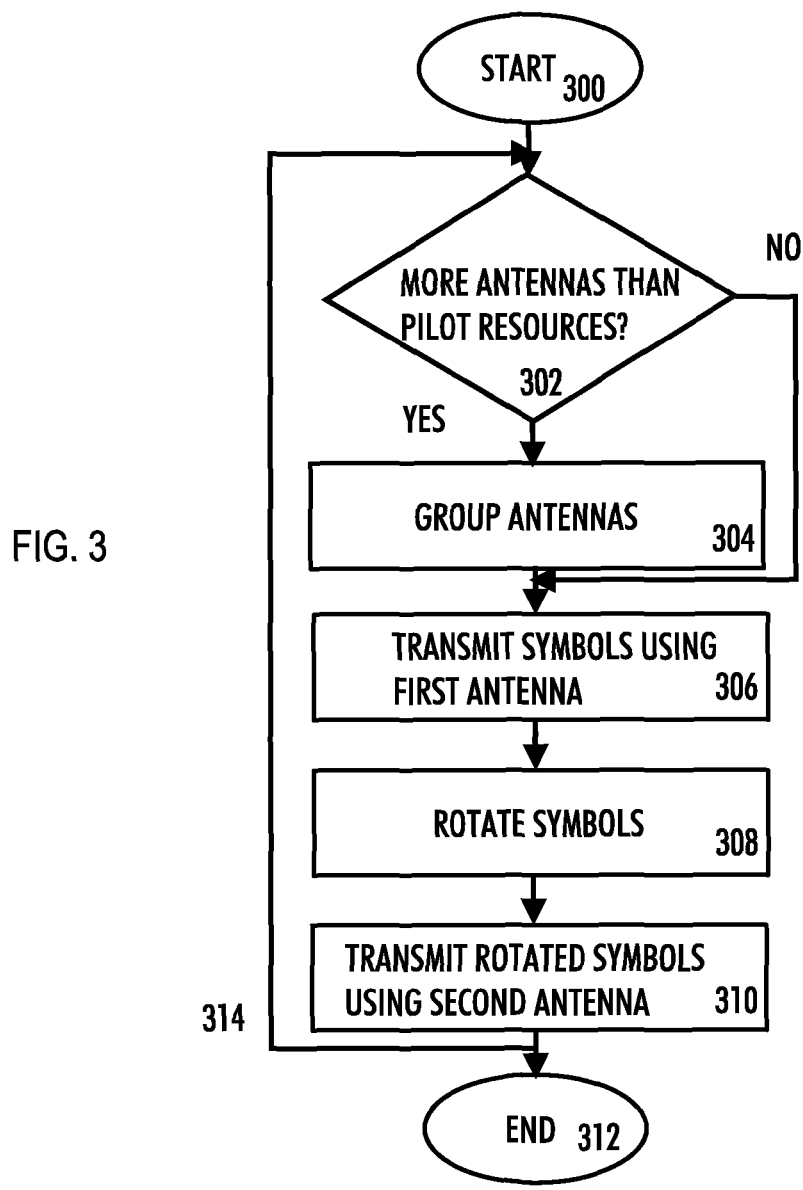
FIG. 3 is a flow chart.

The embodiment depicted in FIG. 3 may be executed in a transmitter. The transmitter typically locates in a user device.

The embodiment starts in 300. The embodiment may be used to transmit Channel Quality Indicators on a Physical Uplink Control Channel.

In block 304, antennas are grouped into antenna groups, if more antennas suitable for transmission are provided than pilot resources per a time slot (302). In this application, pilot resources mean any kind of pilot resources of which pilot symbols are one example. It should be understood that in some circumstances more pilot resources may be provided that pilot symbols. Each antenna group may be though to form a virtual antenna. In this case, multiple transmission antennas composing an antenna group transmit the same signal. The antenna grouping may be reordered between time slots in order to mitigate the impact of possible negative correlation between antennas. As an example, antenna grouping for four transmission (TX) antennas and two reference signals per a time slot may be as follows:

TABLE 1

|  | Slot 0 | Slot 1 |
| --- | --- | --- |
| Virtual TX antenna 1 | TX antenna 1&3 | TX antenna 1&4 |
| Virtual TX antenna 2 | TX antenna 2&4 | TX antenna 2&3 |

Further, between time slots, antenna groups may be re-ordered, for example as follows:

TABLE 2

|  | Slot 0 Antenna group 1 | Slot 0 Antenna group 2 | Slot 1 Antenna group 1 | Slot 1 Antenna group 2 |
| --- | --- | --- | --- | --- |
| Antenna 1 | x |  | x |  |
| Antenna 2 | x |  |  | x |
| Antenna 3 |  | x | x |  |
| Antenna 4 |  | x |  | x |

Alternatively, between time slots, half of the antennas within an antenna group may be multiplied with a predetermined rotator, for instance with −1:

TABLE 3

|  | Slot 0 Antenna group 1 | Slot 0 Antenna group 2 | Slot 1 Antenna group 1 | Slot 1 Antenna group 2 |
| --- | --- | --- | --- | --- |
| Antenna 1 | 1 |  | 1 |  |
| Antenna 2 | 1 |  | −1 |  |
| Antenna 3 |  | 1 |  | 1 |
| Antenna 4 |  | 1 |  | −1 |

These actions mitigate the impact of possible negative correlation between antennas.

In block 306, symbols are transmitted using a first antenna or antenna group of a user device. The transmission is typically carried out according to Release 8.

In block 308, selected symbols are rotated with antenna-specific or antenna group-specific, and/or data symbol-specific phases.

This is typically carried out by multiplying OFDM modulated data symbols (data symb.) of a time slot according to a predetermined precoding sequence for transmission via a second antenna or antenna group, such as:

TABLE 4

| | Data symb. | Ref. signal symb. | Data symb. | Data symb. | Data symb. | Ref. signal symb. | Data symb. |
|---|---|---|---|---|---|---|---|
| TX antenna 1 phase | 1 | 1 | 1 | 1 | 1 | 1 | 1 |
| TX antenna 2 phase | 1 | 1 | exp (j2π/5) | exp (j2π2/5) | exp (j2π3/5) | −1 | exp (j2π4/5) |

Also Reference signal (Ref. Signal symb.) for different transmission antennas or antenna groups may be separated by spreading reference signal symbols block-wise with orthogonal sequences. Block-wise spreading may be carried out by multiplying a reference signal symbol with a corresponding element of the orthogonal sequence. In the example of Table 4, the reference signal symbol of at least one second antenna or antenna group on symbol 5 may be multiplied by −1 effectively implementing block-wise spreading between transmission antennas or antenna groups by using Walsh-Hadamard sequence as an orthogonal sequence.

Also other precoding (antenna phase) sequences for data symbols for transmission via a second antenna or antenna group are possible, such as [+1 −1 +1 −1 +1] or [+1 +1 +1 −1 −1].

The data-symbol specific phases used in a time-slot may also be uniformly distributed on a unit circle.

In block 310, the rotated symbols are transmitted using an at least one second antenna or antenna group of the user device.

An option exists that the rotated symbols may be transmitted through all the antennas or antenna groups. In that case, the rotated symbols are transmitted using the at least one second antenna or antenna group and the first antenna or antenna group. In this option, also the precoding (antenna phase) sequences and, thus, symbol rotations are specific for each antenna or antenna group.

The embodiment ends in block 312. The embodiment may be repeated in many different ways, one example is depicted by arrow 314.

Figure 4:
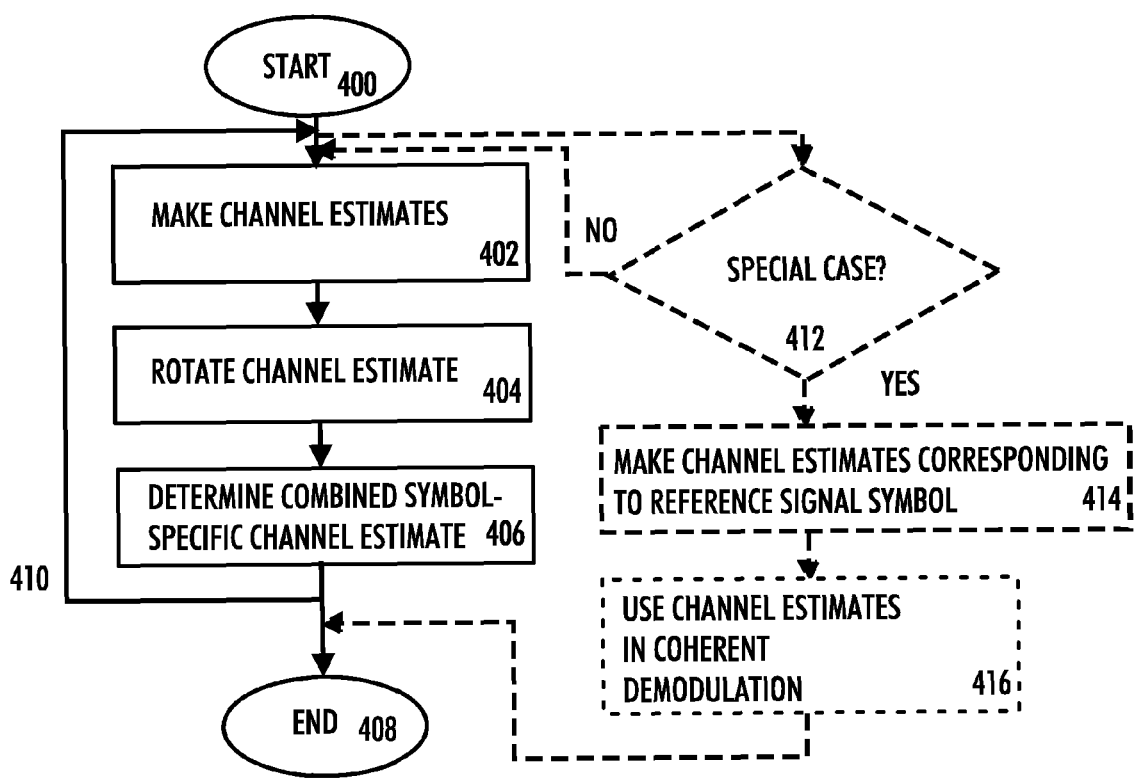
FIG. 4 is another flow chart.

Another embodiment depicted in FIG. 4 may be carried out in a receiver. The receiver typically locates in a node B.

The embodiment begins in block 400.

In block 402, time-slot specific channel estimates are made for signals received from a first and at least one second transmission antenna or antenna group of a user device.

Antenna group specific channel estimates may be obtained by combining interim channel estimates for reference signal symbols 1 and 5 according to the orthogonal cover code used in a transmitter. Orthogonal reference signals are obtainable in many ways, such as by using Hadamard codes [1, 1] or [1, −1] or other orthogonal cover codes between antennas, or by using cyclic shift separation.

Several channel estimation methods exists. The channel estimation (tracking) in OFDM systems is usually based on the use of pilot symbols or subcarriers by correlating a received signal corresponding to transmitted pilot symbols with the pilot symbols.

In block 404, a channel estimate made for a signal transmitted by the at least one second antenna or antenna group of the user device is rotated with antenna-specific or antenna group-specific, and/or data symbol-specific phases. The channel estimates may be rotated symbol-by-symbol according to a predetermined sequence corresponding to the sequence used in a transmitter. Rotation made in a transmitter is explained above by means of FIG. 3.

In block 406, a combined symbol-specific channel estimate is determined by summing and/or averaging the channel estimates. After that, a coherent demodulation may be carried out by using the combined channel estimate.

The embodiment ends in block 408. The embodiment may be repeated in many different ways, one example is depicted by arrow 410.

In block 412, a special case is described: if data-symbol specific phases which are equal to an orthogonal sequence element used on a predetermined reference signal symbol are used, (block 414) the reference signal symbol specific channel estimates are made for signals received from a first and at least one second transmission antenna or antenna group of a user device; and (block 416) the channel estimates corresponding to the predetermined reference signal symbol are used in a coherent demodulation of a data symbol. The predetermined reference signal may be the closest reference signal symbol. In this option, transmit antenna or antenna group specific channel estimates are not made.

It should be understood that another option of the special case exits, namely the use of precoding sequence [1 1 1 1 −1 −1 −1]. Then the following option is provided: making a pilot symbol specific channel estimates for signals received from a first and at least one second transmission antenna or antenna group of a user device (402), and using the channel estimates in a coherent demodulation (416). In an embodiment, interim channel estimates from reference signal symbols 1 and 5 are used as such in coherent demodulation. Channel estimate obtained from symbol 1 is used for data symbols 0, 2 and 3, and channel estimate obtained from symbol 5 is used for data symbols 4 and 6. This is especially suitable for high Doppler circumstances.

The steps/points, signaling messages and related functions described above in FIGS. 3 and 4 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The node B operations illustrate a procedure that may be implemented in one or more physical or logical entities. The signaling messages are only exemplary and may even comprise several separate messages for transmitting the same information. In addition, the messages may also contain other information.

Figure 5:
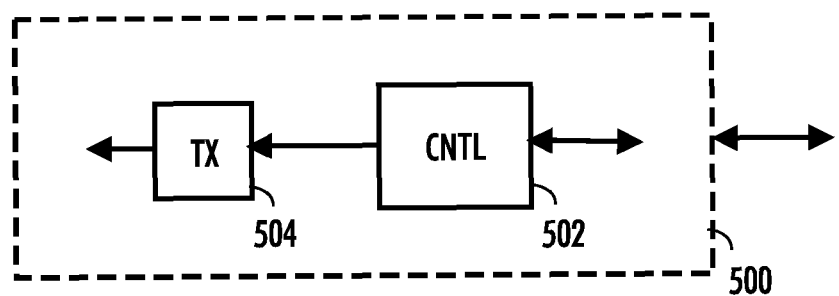
FIG. 5 illustrates an example of an apparatus.

FIG. 5 shows a simplified example of an apparatus wherein embodiments are applicable. The apparatus of FIG. 5 may be located in a user device, such as a mobile device. The mobile device refers to a portable computing device. Such computing devices include wireless mobile communication devices operating with or without a subscriber identification module (SIM), including, but not limited to, the following types of devices: a mobile phone, smartphone, personal digital assistant (PDA), multimedia device and handset. Other examples include a personal computer, game console, laptop (a notebook), and personal digital assistant.

The apparatus typically uses the antennas and radio frequency parts of the user device for transmission as well as a digital signal processor and other units/modules of the user device for processing signals. The apparatus may be implemented as processor or a part of a processor which typically includes a computer program. In the example of FIG. 5, the processor is located in a control unit (502) of a user device (500). The control unit is configured to group antennas into antenna groups, if more antennas suitable for transmission are provided than pilot symbols per a time slot, transmit symbols using a first antenna or antenna group of a user device, rotate selected symbols with antenna-specific or antenna group-specific, and/or data symbol-specific phases, and transmit the rotated symbols using an at least one second antenna or antenna group of the user device. Term "transmit" is used herein to mean transmission control when used in connection to the control unit.

The apparatus may also be a user device, in which case "transmit" may mean both transmission control and physical transmission itself by a transmitter (504) and the part of the apparatus carrying out the antenna grouping and symbol rotation may be located in a control unit of the user device, such as a digital signal processor. Another option is that this part of the apparatus is a separate unit.

According to an embodiment, there is provided an apparatus comprising: means (502) for grouping antennas into antenna groups, if more antennas suitable for transmission are provided than pilot resources per a time slot; means (502, 504) for transmitting symbols using a first antenna or antenna group of a user device; and means (502) for rotating selected symbols with antenna-specific or antenna group-specific, and/or data symbol-specific phases; and means (502, 504) for transmitting the rotated symbols using at least one second antenna or antenna group of the user device.

It is obvious for a person skilled in the art that the apparatus may also include other parts, such as more processors for different tasks, than those shown in FIG. 5.

An embodiment provides a computer program embodied on a distribution medium, comprising program instructions which, when loaded into an electronic apparatus, constitute the antenna grouping and symbol rotation as well as the transmission control.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a server, or a server component, may be configured as a computer or a microprocessor, such as single-chip computer element, including typically a memory for providing storage area used for arithmetic operation and an operation processor for executing the arithmetic operation. An example of the operation processor includes a central processing unit. The memory may be removable memory detachably connected to the apparatus.

Figure 6:
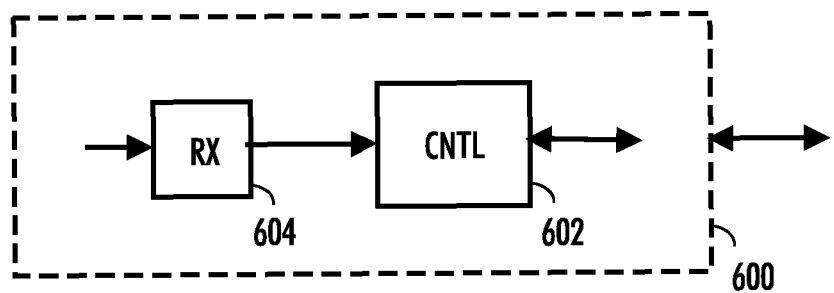
FIG. 6 illustrates another example of an apparatus.

FIG. 6 shows another simplified example of an apparatus wherein embodiments are applicable. The apparatus of FIG. 6 may be located in anode B, such as eNodeB.

The apparatus typically uses the antennas and radio frequency parts of the node B, such as eNodeB (600) for reception as well as a digital signal processor and other units/modules of the node B, such as eNodeB for processing signals. The apparatus may be implemented as processor or a part of a processor which typically includes a computer program. In the example of FIG. 6, the processor is located in a control unit (602) of the node B. The control unit is configured to make time-slot specific channel estimates for signals received from a first and at least one second transmission antenna or antenna group of anode B, rotate a channel estimate made for a signal transmitted by the at least one second antenna or antenna group of the user device with antenna-specific or antenna group-specific, and/or data symbol-specific phases, and determine a combined channel estimate for a time-slot by summing and/or averaging the channel estimates. Term "receive" is used herein to mean reception control when used in connection to the control unit.

The apparatus may also be anode B, in which case "received" may refer to both reception control and physical reception itself by a receiver (604) and the part of the apparatus carrying out making time-slot specific channel estimates for signals received from a first and at least one second transmission antenna or antenna group of a user device, rotating a channel estimate made for a signal transmitted by the at least one second antenna or antenna group of the user device with antenna-specific or antenna group-specific, and/or data symbol-specific phases, and determining a combined channel estimate for a time-slot by summing and/or averaging the channel estimates, may be located in a control unit of the node B, such as a digital signal processor. Another option is that this part of the apparatus is a separate unit.

The apparatus may also include a controller to determine if a precoding sequence [1 1 1 1 −1 −1 −1] is used or if data-symbol specific phases equal to an orthogonal sequence element used on a predetermined reference signal symbol are used. The procedure used in these special cases is clarified in further detail by means of the flow chart of FIG. 4. In these cases the for instance the control unit or a processor located in it may use the channel estimates corresponding to the predetermined reference signal symbol in a coherent demodulation of a data symbol.

According to an embodiment, there is provided an apparatus comprising: means (602) for making time-slot specific channel estimates for signals received from a first and at least one second transmission antenna or antenna group of a user device; means (602) for rotating a channel estimate made for a signal transmitted by the at least one second antenna or antenna group of the user device with antenna-specific or antenna group-specific, and/or data symbol-specific phases; and means (602) for determining a symbol-specific combined channel estimates by summing and/or averaging the channel estimates.

According to an embodiment, there is provided an apparatus comprising: means (602) for determining if data-symbol specific phases equal to an orthogonal sequence element used on a predetermined reference signal symbol are used; means (602) for making reference signal symbol specific channel estimates for signals received from a first and at least one second transmission antenna or antenna group of a user device; and means (602) for using the channel estimates corresponding to the predetermined reference signal symbol in a coherent demodulation of a data symbol.

It is obvious for a person skilled in the art that the apparatus may also include other parts, such as more processors for different tasks, than those shown in FIG. 6.

An embodiment provides a computer program embodied on a distribution medium, comprising program instructions which, when loaded into an electronic apparatus, constitute making time-slot specific channel estimates for signals received from a first and at least one second transmission antenna or antenna group of a user device, rotating a channel estimate made for a signal transmitted by the at least one second antenna or antenna group of the user device with antenna-specific or antenna group-specific, and/or data symbol-specific phases, and determining a combined channel estimate for a time-slot by summing and/or averaging the channel estimates.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a user device or a user device component, may be configured as a computer or a microprocessor, such as single-chip computer element, including typically a memory for providing storage area used for arithmetic operation and an operation processor for executing the arithmetic operation. An example of the operation processor includes a central processing unit. The memory may be removable memory detachably connected to the apparatus.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   a grouper configured to group antennas into antenna groups, if more antennas suitable for transmission are provided than pilot resources per a time slot within a frame structure, wherein the time slot comprises symbols for at least control data and pilot resources;
   a rotator configured to rotate selected symbols with at least one of antenna-specific, antenna group-specific, and data symbol-specific phases;
   a transmitter configured to transmit signals to at least a receiver, wherein the transmitting signals comprises transmitting symbols using a first antenna or first antenna group of a user device and transmitting the rotated symbols using at least one second antenna or second antenna group of the user device, wherein time-slot specific channel estimates are made for the received signals; and
   a multiplier configured to multiply, between time slots, half of the antennas within one of the antenna groups with a predetermined rotator.

2. The apparatus of claim 1, wherein the transmitter is further configured to:
   transmit reference signals from antennas of a user device, the reference signals being separated from each other with orthogonal sequences by multiplying each reference signal symbol in a time-slot with a corresponding orthogonal sequence element.

3. The apparatus of claim 1, wherein the transmitter is further configured to transmit the rotated symbols also by the first antenna or antenna group.

4. The apparatus of claim 1, wherein the data-symbol specific phases are equal to an orthogonal sequence element used on a predetermined reference signal symbol.

5. The apparatus of claim 1, wherein the data-symbol specific phases used in a time-slot are uniformly distributed on a unit circle.

6. The apparatus of claim 1, further comprising:
   a re-orderer configured to re-order the antenna groups between time-slots.

7. The apparatus of claim 1, further comprising:
   a separator configured to separate a reference signal for different transmission antennas or antenna groups by spreading reference signal symbols block-wise with orthogonal sequences.

8. The apparatus of claim 1, wherein the transmitter is further configured to transmit channel quality indicators on a physical uplink control channel.

9. A method comprising:
   grouping antennas into antenna groups, if more antennas suitable for transmission are provided than pilot resources per a time slot within a frame structure, wherein the time slot comprises symbols for at least control data and pilot resources;

rotating selected symbols with at least one of antenna-specific, antenna group-specific, and data symbol-specific phases;
transmitting signals to at least a receiver, wherein the transmitting signals comprises transmitting symbols using a first antenna or first antenna group of a user device and transmitting the rotated symbols using at least one second antenna or second antenna group of the user device, wherein time-slot specific channel estimates are made for the received signals; and
multiplying half of the antennas, between time slots, within one of the antenna groups with a predetermined rotator.

10. The method of claim 9, further comprising:
transmitting reference signals from antennas of a user device, the reference signals being separated from each other with orthogonal sequences by multiplying each reference signal symbol in a time-slot with a corresponding orthogonal sequence element.

11. The method of claim 9, further comprising:
transmitting the rotated symbols also by the first antenna or antenna group.

12. The method of claim 9, wherein the data-symbol specific phases are equal to an orthogonal sequence element used on a predetermined reference signal symbol.

13. The method of claim 9, further comprising:
separating a reference signal for different transmission antennas or antenna groups by spreading reference signal symbols block-wise with orthogonal sequences.

* * * * *